United States Patent
Cooper et al.

[11] Patent Number: 6,129,262
[45] Date of Patent: Oct. 10, 2000

[54] FLUXLESS BRAZING OF UNCLAD ALUMINUM USING SELECTIVE AREA PLATING

[75] Inventors: Ron Cooper, Eastpointe; Gerry Grab, Trenton; Armando Joaquin, Rochester Hills; Tim V. Evans, Ypsilanti; Matthew J. Zaluzec, Canton, all of Mich.

[73] Assignee: Ford Global Technologies, Inc., Dearborn, Mich.

[21] Appl. No.: 08/803,794

[22] Filed: Feb. 24, 1997

[51] Int. Cl.[7] ...................................................... B23K 1/20
[52] U.S. Cl. ..................................... 228/208; 228/262.51
[58] Field of Search ................................... 228/208, 211, 228/262.51

[56] References Cited

U.S. PATENT DOCUMENTS

| | | | |
|---|---|---|---|
| 2,612,682 | 10/1952 | Burrack | 29/189 |
| 2,916,815 | 12/1959 | Donkervoort | 29/504 |
| 3,290,182 | 12/1966 | Eichelman et al. | 148/11.5 |
| 3,375,570 | 4/1968 | Dubusker et al. | 29/472.3 |
| 3,456,331 | 7/1969 | Holden | 29/471.1 |
| 3,482,305 | 12/1969 | Dockus et al. | 29/487 |
| 3,797,087 | 3/1974 | Allardyce et al. | 29/157.3 R |
| 3,849,854 | 11/1974 | Mattioli et al. | 29/157.3 B |
| 3,891,784 | 6/1975 | Allardyce et al. | 427/295 |
| 3,970,237 | 7/1976 | Dockus | 228/208 |
| 3,979,042 | 9/1976 | Peters | 228/183 |
| 3,979,043 | 9/1976 | Lowery | 228/262.51 |
| 4,028,200 | 6/1977 | Dockus | 204/43 T |
| 4,172,548 | 10/1979 | Nakamura | 228/183 |
| 4,214,925 | 7/1980 | Arita et al. | 148/127 |
| 4,526,814 | 7/1985 | Shankar et al. | 427/253 |
| 4,626,295 | 12/1986 | Sasaki et al. | 148/127 |
| 4,699,674 | 10/1987 | Finnegan | 148/127 |
| 4,739,916 | 4/1988 | Ayres et al. | 228/107 |
| 4,890,783 | 1/1990 | Li | 228/122 |
| 5,116,430 | 5/1992 | Hirai et al. | 148/518 |
| 5,268,045 | 12/1993 | Clare | 148/518 |
| 5,281,484 | 1/1994 | Tank et al. | 428/552 |
| 5,377,901 | 1/1995 | Rungta et al. | 228/183 |
| 5,407,124 | 4/1995 | Bose | 228/262.51 |
| 5,547,769 | 8/1996 | Schmitz | 428/653 |

FOREIGN PATENT DOCUMENTS

| | | | |
|---|---|---|---|
| 61-253166 | 11/1986 | Japan | 228/262.51 |
| 820153 | 9/1959 | United Kingdom . | |
| 1489168 | 10/1977 | United Kingdom . | |

*Primary Examiner*—Patrick Ryan
*Assistant Examiner*—Jeffrey T. Knapp
*Attorney, Agent, or Firm*—Joseph E. Malleck

[57] ABSTRACT

A method for fluxless brazing of unclad aluminum includes forming first and second components to be joined of unclad aluminum; etching selected surface areas of the components; depositing an elemental metal on the selected surface areas; abutting the first and second components along the etched surfaces forming a junction; applying an aluminum filler about the junction; and heating the components and filler and bonding the components and filler.

11 Claims, 1 Drawing Sheet

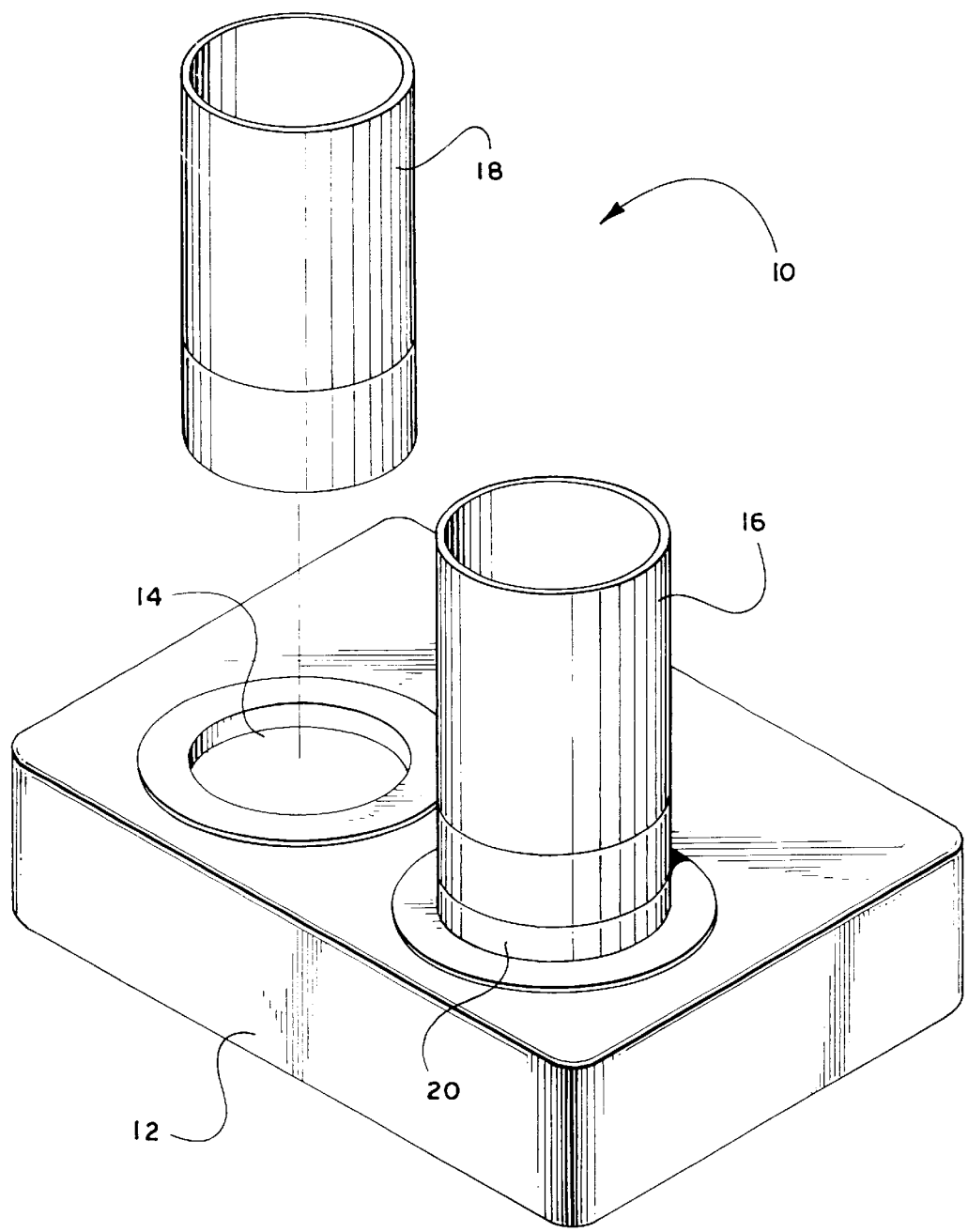

FLUXLESS BRAZING OF UNCLAD ALUMINUM USING SELECTIVE AREA PLATING

FIELD OF THE INVENTION

The present invention generally relates to brazing, and, more specifically to fluxless brazing of unclad aluminum.

BACKGROUND OF THE INVENTION

Clad aluminum alloy metals are joined by a brazing process using a metal filler wherein the metals are heated to near eutectic temperature where the metals bond to form a joint. Controlled atmospheric brazing of aluminum heat exchangers is practiced in automobile manufacturing. In heat exchangers, the braze alloy typically consists of a 4000 series aluminum alloy clad layer roll bonded to a 3000 series aluminum core alloy that is stamped into individual components, assembled into the heat exchanger, fluxed, and brazed in a continuous atmospheric braze furnace using nitrogen as a cover gas to prevent oxidation.

The application of a potassium fluoro-aluminate flux to reduce the native oxide layer on the aluminum alloy is a critical step in achieving a sound, high quality braze joint. Braze sheet material containing high levels of magnesium greater than 0.25 percent by weight cannot be brazed using potassium fluoro-aluminate flux, and more aggressive chloride based fluxes must be used. Unfortunately, more aggressive chloride based fluxes are highly corrosive to the aluminum components after brazing. It is desirable to use 6000 series aluminum alloy instead of 3000 series because of its greater post braze mechanical strength. However, the presence of 0.9 to 1.2 percent by weight of magnesium in the 6000 series alloy prevents its use because of the reactivity of the magnesium with the fluoride flux resulting in a poor braze joint.

There is a process for depositing a thin electroplated nickel or cobalt alloy coating onto clad braze sheet alloys, such as 4000 series alloy cladding on 3000 series alloy core material, for fluxless inert gas brazing of aluminum heat exchangers. The nickel and cobalt alloy coatings are applied directly onto the clad braze sheet coil in a continuous bath plating operation. In this process, the entire component is coated which makes the manufacturing process relatively expensive. Accordingly, it will be appreciated that it would be highly desirable to economically fabricate an automotive heat exchanger or other component using 6000 series aluminum alloys without using flux.

SUMMARY OF THE INVENTION

The present invention is directed to overcoming one or more of the problems set forth above. Briefly summarized, according to one aspect of the present invention, a method for fluxless brazing of unclad aluminum comprises forming first and second components to be joined of unclad aluminum, selecting surface areas of the components; depositing an elemental metal on the selected surface areas, abutting the first and second components along the plated surfaces forming a junction, applying an aluminum filler about the junction, and heating the components and filler and bonding the components and filler.

Using fluxless brazing allows stronger series 6000 aluminum alloy to be used instead of series 3000 alloy. With fluxless brazing, the higher magnesium content of the series 6000 aluminum alloy is not a problem because there is no potassium fluoro-aluminate to react with the aluminum after the bond is formed. Coating only selected areas of the components to be joined conserves material and saves time which reduce manufacturing costs.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The drawing is a simplified perspective view of a preferred embodiment of a heat exchanger with unclad aluminum components selectively coated with a thin film of metal and bonded using fluxless brazing according to the present invention.

DETAILED DESCRIPTION OF THE PREFERRED EMBODIMENTS

Referring to the drawing, a heat exchanger 10 includes a manifold 12 with a plurality of slots 14 to receive a plurality of tubes 16. One tube 18 is shown unattached to better illustrate the coating on selected portions of the tube surface and about the manifold slot. A filler ring 20 facilitates forming a uniform joint where the tubes and manifold join. The manifold and tubes illustrated are formed of 6000 series aluminum alloy and are not clad. After the manifold and tubes are fabricated, they are washed in an alkaline bath which slightly etches their surfaces which aids in the bonding process. Because the tubes are bonded to the manifold at precise locations along their surfaces, it is not necessary to clean or etch the entire tube or manifold. All that is needed is cleaning and etching where the joint will be made.

Conventional tube/header manifold assemblies are constructed of lower strength 3000 series alloys that are essentially free of magnesium. The components are assembled by inserting the tubes into the manifold block, attaching a braze filler ring around the tube, then fluxing the external surface with a potassium floualuminate flux for controlled atmospheric brazing (CAB), or applying a chloride based flux for flame brazing. The present invention uses selective plating of a copper, nickel or copper/nickel multilayer to the area of the tube and manifold where the braze joint is to form. Preferably, a commercial electroplating machine is used to economically plate the end of the tube and the slot in the manifold where the tube to manifold braze joint is to be made. The application of a 4000 series braze ring and subsequent CAB or flame brazing yield a high quality fluxless braze joint. An advantage of this process, whether one uses an electroplated, electroless plated or physical vapor deposition (PVD) applied thin film is that it not only reduces part costs by allowing the use of thinner gage high strength 6000 series aluminum alloy, but it eliminates the need to use a chloride based flux to achieve a high quality braze joint.

The present invention is useful for brazing unclad 1100, 3000 and 6000 series aluminum alloys using a selective area plating technique to deposit an elemental coating of copper, nickel or copper/nickel multilayer coating onto unclad aluminum alloys for fluxless gas brazing. Selective area plating can be used to coat complex shapes such as tubes, manifolds and larger machined components that are not typically stamped from a coiled braze sheet stock. Using higher strength 6000 series aluminum alloys provides design and product advantages with respect to post braze yield strength where a higher strength alloy is required for extended durability. Selective area plating can be achieved using electroplating, electroless plating or physical vapor deposition, such as electron beam evaporation, sputter deposition or the like. The selectively deposited coating suppresses magnesium oxide formation during furnace heating and forms a low melting point eutectic aluminum phase on the surface of the 6000 series or other unclad aluminum alloy prior to brazing.

A 4000 series filler metal alloy, such as 4047, 4054 or 4104, between mating 6000 series components is an effective means of brazing high strength components together in a fluxless environment. The components to be joined are precleaned in an alkaline solution to remove residual oil and slightly etch the surface, followed by an elemental coating of either copper, nickel or a copper/nickel multilayer with each layer being from 1 to 50 microns thick. Brazing is achieved by supplying 4000 series alloy in the form of a thin sheet or braze ring depending on the component being brazed. Typical CAB process conditions are used, i.e., preheat and braze in the temperature range from 575° C. to 600° C. The coating prevents the formation of magnesium oxide, and forms a low melting point aluminum-copper, aluminum-nickel or aluminum-copper-nickel eutectic between 548° C. and 600° C. depending on the thin film coating combinations applied to the 6000 series aluminum alloy.

It will be now appreciated that there has been presented a method for fluxless brazing of unclad aluminum. The method includes forming first and second components to be joined of unclad aluminum from among unclad 1100, 3000 and 6000 series aluminum, cleaning the first and second components in an alkaline solution and etching selected surface areas of the first and second components, and depositing elemental metal from among copper and nickel metals to the selected surface areas of the first and second components in a thin film having a thickness in a range of about 1 to 50 microns. Selective area plating has several advantages. Less surface area is plated which reduces costs, less plating solution is used reducing environmental impact, and less aluminum is used because thinner high strength alloys are used. The method includes abutting the first and second components along the plated surfaces forming a junction, applying a 4000 series aluminum filler about the junction, and heating the first and second components and the aluminum filler to a temperature in a range of about 575° C. to 600° C. and bonding the components and filler.

Operation of the present invention is believed to be apparent from the foregoing description and drawings, but a few words will be added for emphasis. A fluxless braze joint was formed between two 6061 aluminum alloys that were plated with a 10–50 micron plated nickel layer and brazed with a 4047 clad alloy in a CAB furnace with the result that the joint was homogeneous, uniform and free of pinholes. Being pinhole free is critical in heat exchangers used in the cooling system of a vehicle.

While the invention has been described with reference to series 1100, 3000 and 6000 aluminum alloys, it is apparent that the invention is easily adapted to other aluminum alloys. And while the invention has been described with reference to copper and nickel platings, other platings can be used to fit a particular need or condition. As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method for fluxless brazing of unclad aluminum, comprising the steps of:

forming first and second components to be joined of unclad aluminum;

defining selected surface areas of said first and second components where said first and second components are to be joined;

depositing an elemental metal to said selected surface areas of the first and second components thereby plating only said selected surface areas with said elemental metal;

abutting said first and second components along said plated surfaces forming a junction;

applying an aluminum filler about said junction; and heating said first and second components and said aluminum filler and bonding said components and filler.

2. A method for fluxless brazing of unclad aluminum, comprising the steps of:

forming a first component to be joined of unclad aluminum from among unclad 1100, 3000 and 6000 series aluminum;

forming a second component to be joined of unclad aluminum from among unclad 1100, 3000 and 6000 series aluminum;

cleaning said first and second components in an alkaline solution and etching selected surface areas of said first and second components;

depositing elemental metal from among copper and nickel metal to said selected surface areas only of said first and second components in a coating having a thickness in a range of about 1 to 50 microns;

abutting said first and second components along said coated surfaces forming a junction;

applying a 4000 series aluminum filler about said junction; and heating said first and second components and said aluminum filler to a temperature in a range of about 575° C. to 600° C. and bonding said components and filler.

3. A method for fluxless brazing of unclad aluminum, comprising the steps of:

forming first and second components to be joined of unclad aluminum;

etching selected surface areas of said first and second components;

depositing an elemental metal to said selected surface areas of the first and second components thereby plating only said selected surface areas with said elemental metal;

abutting said first and second components along said plated surfaces forming a junction;

applying an aluminum filler about said junction; and heating said first and second components and said aluminum filler and bonding said components and filler.

4. The method of claim 3, including selecting said unclad aluminum from among 1100, 3000 and 6000 series aluminum.

5. The method of claim 3, including depositing elemental copper to a thickness in a range of 1 to 50 microns.

6. The method of claim 3, including depositing elemental nickel to a thickness in a range of 1 to 50 microns.

7. The method of claim 3, including heating said components to a temperature in a range of about 548° C. to 600° C. and forming an aluminum eutectic.

8. The method of claim 3, including heating said first and second components and said aluminum filler to a temperature in a range of about 575° C. to 600° C.

9. The method of claim 3, including heating said first and second components and said aluminum filler in a controlled atmosphere.

10. The method of claim 3, including depositing alternate layers 1 to 50 microns in thickness of elemental copper and nickel to a total thickness in a range of 2 to 50 microns.

11. The method of claim 10, including heating said components to a temperature in a range of about 548° C. to 600° C. and forming an aluminum eutectic.

* * * * *